United States Patent [19]

Ribeiro

[11] 3,753,376
[45] Aug. 21, 1973

[54] TRANSFER AND DIFFERENTIAL REDUCTION BOX FOR MOTOR VEHICLES

[75] Inventor: Jose Luiz Whitaker Ribeiro, Sao Paulo, Brazil

[73] Assignee: Engesa-Engenheiros Especializados S.A., Sao Paulo, Brazil

[22] Filed: Feb. 9, 1971

[21] Appl. No.: 113,953

[52] U.S. Cl............. 74/665 GA, 74/15.2, 74/710.5, 180/23, 180/24.09
[51] Int. Cl....................... F16h 37/08, F16h 37/06
[58] Field of Search.................. 74/710.5, 665 GA, 74/15.2, 477; 180/24.09, 23

[56] References Cited
UNITED STATES PATENTS

| | | | |
|---|---|---|---|
| 2,766,628 | 10/1956 | Wilson | 74/15.88 |
| 2,158,320 | 5/1939 | Bock | 74/15.2 X |
| 2,395,108 | 2/1946 | Donley et al. | 74/665 GA X |
| 2,505,586 | 9/1957 | Lucas | 74/710.5 X |
| 3,090,254 | 5/1963 | Stump | 74/710.5 |
| 3,283,298 | 11/1966 | Kaiser | 74/477 X |
| 3,354,741 | 11/1967 | Johnston, Jr. et al. | 74/477 |
| 3,407,893 | 10/1968 | Hill et al. | 74/710.5 X |
| 3,529,487 | 9/1970 | Dolan | 74/477 |

FOREIGN PATENTS OR APPLICATIONS

| | | | |
|---|---|---|---|
| 717,803 | 9/1965 | Canada | 74/15.2 |

Primary Examiner—Charles J. Myhre
Assistant Examiner—Thomas C. Perry
Attorney—Steinberg & Blake

[57] ABSTRACT

A transmission box with power take-off, for transmitting power to four or six wheels, comprising one or more internal differentials, which may be locked, a clutching system with two parallel shafts alternately lockable, through the agency of a transverse rod and grooves in the shafts; interchangeable parts and parallel shafts equidistant from one another; the clutching system includes a number of rods articulated one to the next. The locking of the differential is provided by way of a gear transmission and clutch in parallel with the differential outputs.

12 Claims, 5 Drawing Figures

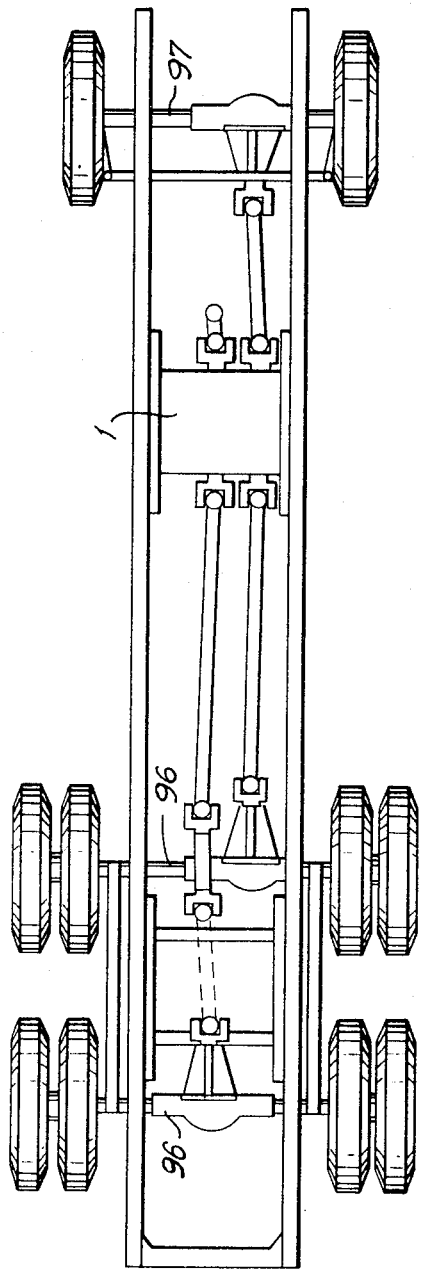

INVENTOR.
José Luiz Whitaker Ribeiro
BY
Steinberg and Blake
ATTORNEYS

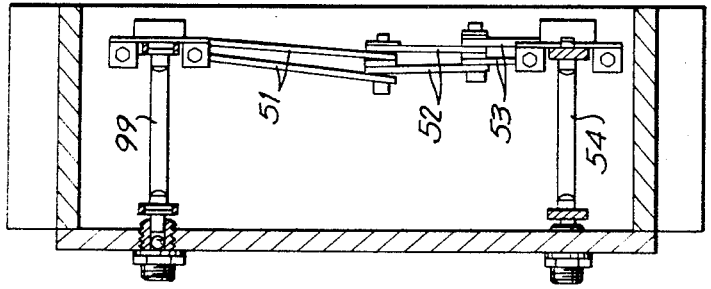
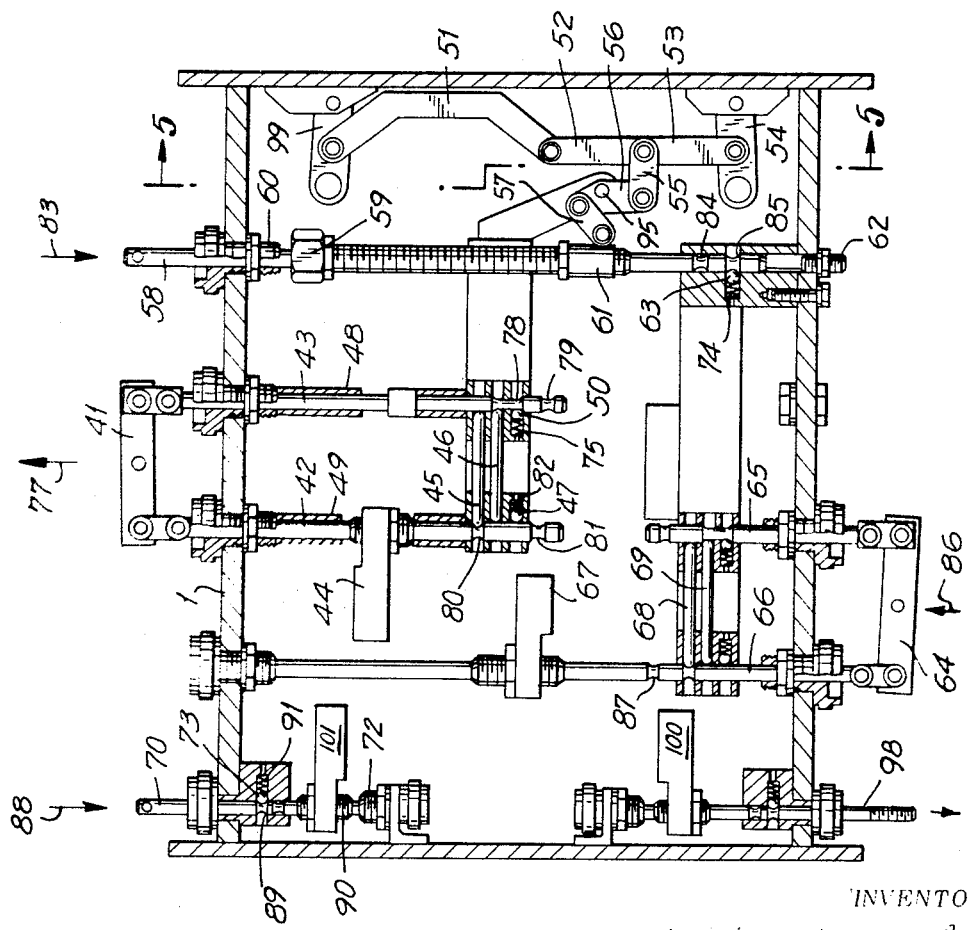

TRANSFER AND DIFFERENTIAL REDUCTION BOX FOR MOTOR VEHICLES

This invention relates to a transmission box for a vehicle and serving mainly to receive power from one shaft and transmit the power to one or more shafts, not all of which need to be driven simultaneously. According to the invention there is provided a transmission box with power take-off, fittable to motor vehicles, for transmitting power to four or six wheels, characterised in that it has an internal differential and therefore has power outputs differentiated from one another, with provision for locking the differential. Another feature of the box is that it can provide two differentiated outputs - i.e., the box has a differential which is disposed between the outputs.

The box according to the invention is commonly fitted to civil and military vehicles. The reason for this use is that irregular terrains, tyre pressure differences, road curvature and other adverse factors are decisive elements in wear and tear of the vehicle, more particularly its tyres, and matters worsen when the vehicle has two or more driving axles.

On the other hand, a vehicle may of course be paralysed when one of its driving wheels loses adhesion, for instance, by becoming suspended or by skidding. The box according to the invention obviates this disadvantage too by making it possible to lock the interdifferential differential, so that the vehicle can operate satisfactorily in difficult conditions.

In brief, the box serves to receive power from the normal vehicle gearbox and transmit the received power to the shafts with different reductions and with or without differentiation between the output motions; also, the box enables the output of the normal gearbox to be connected to one or more of the output shafts of the box according to the invention, with or without simultaneous movement of all such shafts.

Clearly, therefore, the addition of the box according to the invention to a normal 4 × 2 vehicle (four wheels with drive on two wheels) can help to convert the vehicle into a 4 × 4 vehicle (four wheels, all driving) or convert a 6 × 4 (six wheels with four wheels driven) to a 6 × 6 vehicle (six wheels, all driven) or 4 × 2 lockable. The abbreviations 6 × 4, 6 × 2 etc. will be used hereinafter, the first numeral denoting the total number of vehicle wheels and the second numeral denoting the number of driven wheels.

The invention will be described further, by way of example, with reference to the accompanying drawings wherein:

FIG. 1 is a diagram showing how the invention is of use in a truck having three axles - i.e., six wheels, the rear wheels being twin wheels;

FIG. 4 is a horizontal section through the clutching system, and

FIG. 5 is a cross-section through the clutching system on the line 5—5 of FIG. 4.

FIG. 1 shows a 6 × 6 vehicle comprising the box according to this invention. A vehicle of this kind usually operates as a 6 × 4 vehicle - i.e., the front axle 97 is not driven. The two rear axles 96 are then driven with differentiation by the interdifferentials differential and the box also enables a reduction to be provided. Consequently, when the vehicle is running on a good road, for instance, an asphalt road, 6 × 4 condition is used and there is relatively little wear and tear, more particularly of the tyres. The front axle is connected to the drive only when ground conditions are such that it would be difficult to run the vehicle on a 6 × 4 basis, and in this case the interdifferentials differential is also locked. In short, when the front axle is connected to the drive, the power outputs for the rear axles are locked simultaneously and the vehicle can run in direct drive or with a reduction.

Clearly, a vehicle of this kind has a wide range of uses and is versatile.

Figure 3:
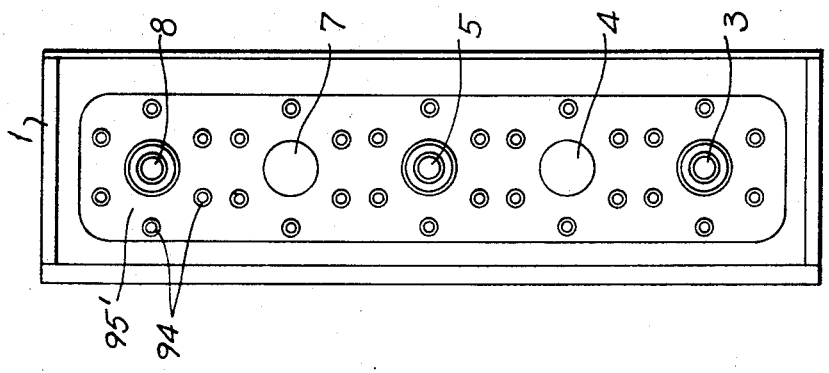
FIG. 3 is a side view of the box.
Figure 2:
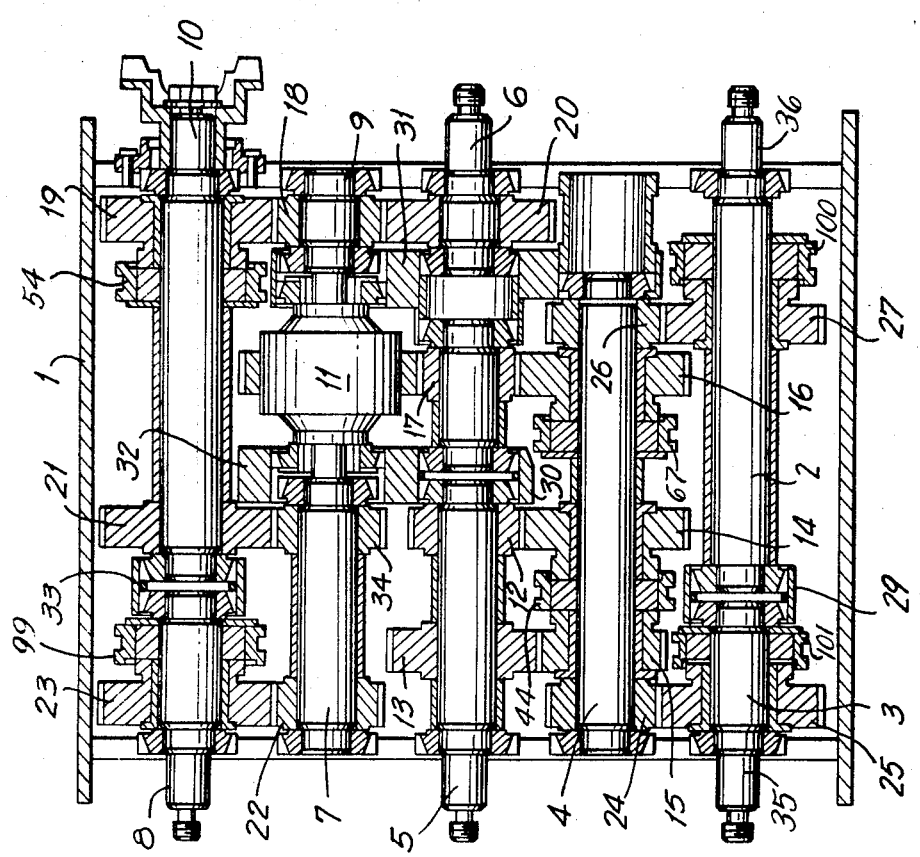
FIG. 2 is a diagrammatic plan and partly sectioned view of the box when open, the clutching system not being shown.

According to a feature of the invention, and as can be seen in FIGS. 2 and 3, the invention provides a transfer and interdifferential reduction box 1 with two power outputs. Dispensed in the box are half-shafts 2–10 which are parallel to and/or in line with one another and an interdifferential differential 11 which is a differential of a kind normally used in vehicles and which is provided in the box according to the invention; splined gears 12, 13 are coupled with half-shaft 5 and plain engageable gears 14–16 may be clutched to the half-shaft 4. Also provided are gear sets comprising a splined gear 17 and splined gear 18, a plain engageable gear 19, splined gears 20–22, a plain engageable gear 23, a splined gear 24 and a plain engageable gear 25, a splined gear 26 and a plain engageable gear 27. The box also comprises clutch rings 100, 101, a bearing 29 for the shafts 2, 3, a bearing 30 for the shafts 5, 6, a bearing 31 for the shaft 9 and differential 11, a bearing 32 for the shaft 7 and the differential 11, a bearing 33 for the shafts 8 and 10, and a splined gear 34. The term "plain engageable gear" is used herein to denote a gear having plain hub - i.e., not splined and engageable.

FIG. 3 shows details of how the shafts are secured to the box 1; for instance, shaft 8 is secured by means of a flange 95' and screws 94. This feature is the same for the other shafts and is of purely constructional character.

The box 1 operates as follows:

Power is input to box 1 via shaft 5 and is transmitted by way of gears 12–15 to shaft 4. Since the gears 14, 15 are plain and engageable, either "direct" drive is engaged - i.e., the box provides a transmission ratio of unity - or the box provides a step-down, depending upon the position of clutch ring 44. Clearly, therefore, when clutch ring 44 is in an intermediate position the box according to the invention is in neutral.

The input to shaft 4 is transmitted by gear 16 to splined gear 17 which transmits the torque to the interdifferentials differential 11 which differentiates the torque as between the shafts 7 and 9. If the gear 19 is in the disengaged position, the input to shaft 9 is transmitted to shaft 6 via gears 18, 20 and so the shaft 6 forms one of the power outputs of box 1. Similarly, when the gear 19 is in the disengaged state and assuming that gear 23 is in a similar state, the input to shaft 7 is transmitted to shaft 10 via gears 34 and 21, the shaft 10 forming another output of the box. The box therefore operates with direct drive or with a step-down and the front-axle output 8 of the box is inoperative.

The engageable gear 19 is the gear adapted to lock the differential 11, for when gear 19 is engaged the shafts 7, 9 always rotate similarly and so the differential 11 is locked and the differentiation previously provided ceases. It will be noted that by engaging gear 19 with gear 18, the action of the differential 11 is eliminated by compelling the outputs 7 and 9 of the differential 11 to have a predetermined relationship with respect to each other on the one hand through the gears 34 and 21 and on the other hand through the gears 18 and 19. Thus, the locking out of the differential 11 does not take place by any direct action on the differential 11 itself but rather only by acting on the outputs of the differential 11.

When gear 23 is engaged the half-shaft 8 is driven and a drive is provided to one further box output - i.e., the vehicle front axle starts to be driven if the vehicle is a 6 × 6 vehicle - i.e., a vehicle having six driven wheels.

The gears 14, 15, 19 and 23 can be clutched and declutched in various combinations for the box to operate with two or three outputs providing transmission ratios of unity or less, with or without locking; if the box were to be used on a 6 × 6 vehicle, the vehicle could operate with a transmission ratio of unity or less and be locked or not as a 6 × 6 or 6 × 4.

The two other box outputs - the front power take-off associated with shaft 3 in FIG. 2 and the rear power take-off 36 - operate as follows: as will be seen when clutching is studied these two take-offs are operated independently of the other box outputs and independently of one another.

Gear 26 is driven by shaft 4 and drives shaft 2 via gear 27. Since gear 27 is a plain engageable gear, engagement thereof provides an output for the rear take-off via shaft 2 in FIG. 2.

Gear 24 is driven by shaft 4 and drives shaft 3 via gear 25; since gear 25 is a plain engageable gear engagement thereof drives the front power take-off via shaft 3, FIG. 2.

Engagement of gear 23 is simultaneous with the engagement of gear 19, as will be seen hereinafter when the operation of the clutching system of the box is described. The reason for using this feature is that the front axles of 6 × 6 and 4 × 4 vehicles are driven only when the vehicle is running over rough terrain and not in easier operating conditions.

According to another feature of the invention, the box 1 has a clutching system, since the box shown has five independent drives, and a description will now be given with reference to FIGS. 4 and 5. The clutching system of the box comprises central parallel shafts 42, 43 and, interconnecting the same, a rod 41 disposed outside the box. Shaft 42 is associated with an end stop device 49 and is connected to clutch fork 44 for the gears 14, 15 shown in FIG. 2. Shaft 43 is also associated with an end stop device 48. The movements of the two shafts 42, 43 are restricted by locking bars 45, 46 perpendicular to the shafts 42, 43. A ball 47 biased by a spring 82 is disposed near the bar 46 and continuous with shaft 42. Shaft 43 is formed with an appreciable neck or recess or the like 78 at the height of locking bar 46 and co-operating with a ball 50 biased by spring 75; near its end shaft 43 is formed with another recess or neck 79. At the level of locking bar 45 the shaft 42 is formed with a neck or recess or the like 80, and near its end shaft 42 is formed with another neck or recess 81 adapted to co-operate with the ball 47.

The example shown using the bars 45, 46 represents one of the features of the invention, residing mainly in that the shafts are paralled to one another and are locked by one or more transverse bars in association with recesses or necks or the like in the shafts, the locking procedure being such that when either shaft is locked the other is released.

Disposed laterally of and substantially parallel to the shafts 42, 43 is a set of actuating rods 51–53, 55, 57 which are pivotally inter-connected and which, except for the rod 51 in the example shown, are straight; the rod 51 is longer than the others and has a shape as shown in FIG. 4 solely to leave space for other parts. Rod 51 is articulated to clutch ring 99 of gear 23 visible in FIG. 2. Each of the rods 51–53, 55, 57 is pivotally connected seriatim to the next and rod 53 is pivotally connected to clutch ring 54 of gear 19 visible in FIG. 2, while an actuating rocker 56 is pivotally connected between the rods 55 and 57. Disposed at the centre of rocker 56 is an eccentric screw 95 via which all the rods of the system can be adjusted. Rod 57 is pivoted to an actuating nut 61 which is disposed on another shaft 58 to be described hereinafter. As a constructional feature, and as can be seen in FIG. 5, the rods are dual, but this detail is immaterial for the purposes of this invention.

The clutch shaft 58 which extend through and projects from box 1 has therein an end stop device 60 and a travel-limiting nut 59; further on shaft 58 is pivotally connected by way of nut 61 to rod 57. On the other side of box 1 shaft 58 is secured by means of an end-stop screw 62 which is outside the box; shaft 58 is formed near this end with two grooves or necks or the like 84, 85 engageable by a nearby ball 63 biased by a spring 74.

Disposed outside box 1 at the opposite end thereof to the end where rod 41 is disposed is a bar 64 which interconnects clutching shafts 65, 66 while being swingable about an axis at its center, as shown at the bottom of FIG. 4, and which also connects them to a clutching system similar to the one previously described (42, 43, 46) by means of clutch fork 67 of gear 16 visible in FIG. 2. The set comprises one or more locking bars 68, 69 and associated recesses, balls and springs.

The box also comprises two separate clutching shafts 70, 98 which extend from opposite sides of the box.

A description will now be given of the operation of the mechanism in its different positions.

a. Selection of step-down, direct drive and neutral

When rod 41 is operated in the direction indicated by arrow 77, the shafts 42, 43 are moved. In the position shown in FIG. 4, shaft 42 is locked by locking bar 45 and only shaft 43 can move in the direction of arrow 77; in the opposite direction bar 46 locks shaft 43. The same moves until locking bar 45 engages in recess 78 in shaft 43; at this level locking bar 46 engages right home in recess 78. Since locking bar 45 has become free to move, it unlocks shaft 42 which in turn moves in the direction indicated by the arrow 77, so that bar 45 disengages from recess 80 in shaft 42 - i.e., it remains on the surface thereof - and engages in recess 78 in shaft 43. Ball 47, urged by spring 82, then engages in recess 81 in shaft 42.

As rod 41 continues to be operated, shaft 42 continues to move and ball 47 is pressed against its spring until locking bar 46 engages in recess 81 in shaft 42 and thus unlocks shaft 43; movement of shaft 42 is limited by end stop device 49 which engages with the projection on shaft 42. Since shaft 43 is now unlocked it moves and forces locking bar 46 into recess 81 of shaft 42 to lock the same; movement of shaft 43 is also limited by end stop device 48 which abuts and abutment on shaft 43 whereafter ball 50 urged by spring 75 engages in recess 79 in shaft 43.

Clutch fork 44 secured to shaft 42 can therefore take up three distinct positions as follows:

Position 1: The position shown in FIG. 4, with shaft 42 locked by locking bar 45 engaging the recess 80 in shaft 42; this position corresponds to a step-down in the transmission ratio of the box in the manner hereinbefore described - i.e., the box provides a final reduction.

Position 2: With ball 47 engaged in recess 81 in shaft 42, corresponding to the box being in neutral as described previously - i.e., no power is transmitted.

Position 3: With locking bar 46 engaged in recess 81 in shaft 42 to lock the same, the box then being in direct drive as previously described - i.e., the transmission ratio provided by the box is unity.

Clearly, these three positions of step-down, neutral and direct drive correspond to engaging and disengaging the gears 14, 15 respectively as previously stated.

b. Selection of locking and front-wheel drive

This selection acts on the plain engageable gears 23, 19 which are shown only in FIG. 2. In the position shown diagrammatically in FIG. 4, the gears 19, 23 are in engagement with their respective shafts. Also, the position is a locked one since the rods 52, 53 are in alignment with one another. When shaft 58 is moved in the direction indicated by an arrow 83, it takes with it nut 61 to which rod 57 is pivoted. The movement of rod 57 actuated rocker 56 which in turn actuates rod 55. Rod 55 first unlocks the system, then moves the rods 52, 53 towards the box wall. The movement of rods 52, 53 moves rod 51 which operates clutch forks 99, 54. The shaft stops only when its end abuts end-stop 62, since ball 63 then engages in recess 84 in shaft 58. As can be seen in the position visible in FIG. 4, ball 63 is disposed in recess 85 in shaft 58.

The mechanism described therefore has two different positions as follows:

Position 1: The position shown in FIG. 4, with the rods 52, 53 in alignment with one another to lock the clutch forks 54 and 99 of the gears 19, 23 (FIG. 2). In this position the differential is locked and the box output driving the front axle is engaged. This position can be changed only by forces outside the box and not by forces therein.

Position 2: When the ends of rod 55 are in alignment with the two ends of rocker 56, in which case ball 63 is in recess 84 in shaft 58 and the gears 19, 23 are disengaged.

c. Clutching control for the gear for simultaneous operation of all the outputs or just of the power take-offs This control is effected through the agency of the plain engageable gear 16, which operates similarly to what has been described in case (a) hereinbefore. When rod 64 is moved in the direction indicated by an arrow 86 in FIG. 4, the disengaging fork 67 is operated. In this case, as already described, a locking system similar to what was described in (a) is provided.

There are two separate positions as follows:

Position 1: The position shown in FIG. 4 and corresponding in FIG. 2 to the gear 16 being disengaged; only the front power take-off 35 and the rear power take-off 36 operate.

Position 2: With rod 68 disposed in recess 87 in shaft 66, the gear 16 of FIG. 2 is engaged and the whole box can operate simultaneously.

d. Selection of front power take-off

The front power take-off, which is provided by way of shaft 3 in FIG. 2 and element 35 is controlled by means of the gear 25 shown in FIG. 2. In the position shown in FIG. 4 the gear 25 is in the engaged position - i.e., the front power take-off is being driven via the shaft 3. When shaft 70 is moved in the direction indicated by arrow 88 in FIG. 4, the ball 73 originally engaged in recess 89 in shaft 70 is compressed against spring 91; as shaft 70 moves the ball 73 moves on to the surface thereof and out of recess 89. The movement of shaft 70 is limited by an abutment 90 thereon abutting an end stop device 72. When shaft 70 moves, clutch ring 101 is moved to engage or disengage the gear 25.

The mechanism therefore has two different positions as follows:

Position 1: The position shown in FIG. 4, with ball 73 engaged in recess 89 in shaft 70, so that gear 25 is engaged.

Position 2: When projection 90 on shaft 70 abuts end-stop device 72, gear 25 then being disengaged.

e. Selection of rear power take-off

The rear power take-off can be selected by means of gear 27 in just the same way as described in section (d). In the position shown in FIG. 4, the gear 27 is disengaged, but can be engaged by the shaft 98 being moved. When shaft 98 is moved, clutch ring 100 moves to engage or disengage the gear 27.

In the box according to the invention all the shafts have the same splining and the same clutch sleeves. The box is also designed so that all its parts are interchangeable including the clutching system. A wide variety of reductions and interdifferentiation can therefore be provided just by minor rearrangements of the items which make up the box.

The dimensions and the number of outputs and inputs of this kind of box can of course vary to suit requirements.

The invention is very versatile in its uses and is very simple, differing substantially from all the other kinds.

A special feature of boxes according to this invention is that they have a number of shafts parallel to one another and all the same distance apart from one another, for all the gears used have the sum of their pitch diameters equal.

The following features, as well as others clearly set forth herein, fall under this invention. The box is a prismatic box made of cut welded metal plate secured to the truck chassis.

According to a feature of the invention, if the integers 2, 3 and 25–27 and the respective clutching systems are removed, the box becomes a transfer and interdifferential reduction box without power take-offs.

According to another feature of the invention (not shown), if the interdifferentials differential 11 is removed, the two half-shafts 7, 9 become a single unitary half-shaft and, of course, a single splined gear is provided which is coupled with such half-shaft. In this case, of course, the locking gear 19 and its clutch are superfluous and the invention then provided a transfer and reduction box with power take-off but without differentiation. It is a simple matter, if thought advantageous, to remove the power take-offs to provide a transfer and reduction box without differentiation and without power take-offs.

According to another feature of the invention, removal of the differential 11 and combining the two half-shafts 7, 9 to form a single continuous half-shaft can be combined with a front and rear power take-off, neither of which has differentiation.

As is apparent from the above description, the gears 12-15 and the shifting ring 44 provide a means for selecting either neutral, direct drive, or a step-down transmission, irrespective of whether this selected drive is transmitted to the axles or to the power take-off means 35, 36, or to both the axles and the power take-off means. Thus, the selection of the drive is completely independent of the use which is to be made of the drive. The clutch ring 101 and gear 25 form a means for engaging or disengaging the front power take-off 35, while the clutch ring 100 and gear 27 form a means for engaging or disengaging the rear power take-off 36, so that with the latter pair of means it is possible for the operator to select the operation of one or both of the front and rear power take-offs 35 and 36. The gear 16 together with the clutch ring 67 form a means for selectively operating the power take-off means 35, 36 either with or without transmission of a drive to the axles of the vehicle, so that it is possible to operate the power take-offs either while the vehicle is stationary or while it is traveling. Assuming that the gears 19 and 23 are disengaged, the differential 11 will transmit the power from the gear 17 to the shafts 7 and 9 so that a predetermined differential is maintained therebetween, and thus through the gears 34 and 21 the dirve shaft 10 for one of the rear axles is driven at a predetermined ratio with respect to the drive shaft 6 for the other of the rear axles, this shaft 6 being driven through the gears 18 and 20. The gear 19 together with the clutch ring 54 form a means for locking out the differential 11 by compelling the pair of outputs thereof to have a predetermined relationship with respect to each other, and thus when the gear 19 is engaged, as shown in FIG. 2, the pair of drive shafts 6 and 10 to the pair of rear axles will compel the pair of rear axles to have fixed predetermined ratio between speeds of rotation. The linkage 51–53 is operatively connected with the gear 19 and the clutch ring 54 thereof to compel the clutch ring 99 and gear 23 to be actuated so as to assume the engaged position shown in FIG. 2 whenever the gear 19 is engaged so that in this way the front wheel drive shaft 8 is driven whenever the differential 11 is locked out, and of course at this time the front wheels and all of the rear wheels are driven in a predetermined relationship with respect to each other. Moreover, with the structure of the invention both the front and all of the rear axles, or only the rear axles, and either one or both of the power take-offs 35 and 36 with or without the front and rear axles or with or without only the rear axles can all be driven either with a direct drive or with a step-down transmission.

I claim:

1. In a vehicle having a pair of rear axles and a front axle, a transmission assembly comprising parallel power input and output shafts, drive-selection means connected between said shafts for selecting a neutral, direct drive, or step-down transmission from said power input to said power output shaft, gear-drive means operatively connected with said power output shaft for transmitting a drive therefrom, differential means operatively connected to said gear-drive means to be driven thereby and having a pair of differential outputs driven with a predetermined differential therebetween by said differential means, a pair of rear axle drive shafts respectively connected operatively to said differential outputs to be driven thereby and operatively connected to said pair of rear axles for driving the latter, differential lock-out means operatively connected with said pair of differential outputs for selectively providing a predetermined relationship therebetween independently of said differential means for locking out the latter so as to drive the pair of rear axles with a predetermined ratio when said differential means is locked out, said differential lock-out means including a pair of gears respectively fixed to said differential outputs for rotary movement therewith, a shaft situated adjacent said differential means and extending parallel to said outputs, and a pair of gears carried by the latter shaft, one of said pair of gears being permanently enmeshed with one of the gears on one of said differential outputs and a clutch operatively connected with the other of said pair of gears for acting on the latter to place said shaft which carries said pair of gears either in driving engagement with said gear on the other of said differential outputs or out of driving engagement therewith, so that through said clutch a transmission can be provided for locking out said differential means, a front drive shaft operatively connected to the front axle for driving the latter, and means operatively connected with said differential lock-out means for transmitting a drive from one of said differential outputs to said front drive shaft only when said differential lock-out means is operative to lock out said differential means, so that when said differential means is locked out said front axle will be driven in a predetermined manner with respect to both rear axles.

2. The combination of claim 1 and wherein a pair of power take-off means are operatively connected to said power output shaft to be driven thereby.

3. The combination of claim 2 and wherein each of said power take-off means includes a means for selectively connecting each power take-off means to or disconnecting it from said power output shaft.

4. The combination of claim 3 and wherein said gear-drive means includes a means for selectively connecting said gear-drive means to or disconnecting it from said power output shaft, so that either one of both of said power take-off means may be driven with or without driving said pair of rear axles and with or without driving said front axle.

5. In a vehicle having a pair of rear axles and a front axle, a transmission assembly comprising parallel power input and output shafts, drive-selection means connected between said shafts for selecting a neutral, direct drive, or step-down transmission from said power input to said power output shaft, gear-drive means operatively connected with said power output shaft for transmitting a drive therefrom, differential means operatively connected to said gear-drive means to be driven thereby and having a pair of differential outputs driven with a predetermined differential therebetween by said differential means, a pair of rear axle drive shafts respectively connected operatively to said differential outputs to be driven thereby and operatively connected to said pair of rear axles for driving the latter, differential lock-out means operatively connected with said pair of differential outputs for selectively providing a predetermined relationship therebetween independently of said differential means for locking out the latter so as to drive the pair of rear axles with a predetermined ratio when said differential means is locked out, a front drive shaft operatively connected to the front axle for driving the latter, and means operatively connected with said differential lock-out means for transmitting a drive from one of said differential outputs to said front drive shaft only when said differential lock-out means is operative to lock out said differential means, so that when said differential means is locked out said front axle will be driven in a predetermined manner with respect to both rear axles, a pair of power take-off means operatively connected to said power output shaft to be driven thereby, each of said power take-off means including a means for selectively connecting each power take-off means to or disconnecting it from said power output shaft, said gear-drive means including a means for selectively connecting said gear-drive means to or disconnecting it from said power output shaft, so that either one or both of said power take-off means may be driven with or without driving said pair of rear axles and with or without driving said front axle, said power input shaft and one of said rear axle drive shafts being in line and having a common axis, said front axle drive shaft and the other of said rear axle drive shafts being in line and having a common axis parallel to the axis of said power input shaft, said pair of differential outputs having a common axis situated between and parallel to the pair of axes of said rear axle drive shafts.

6. The combination of claim 5 and wherein said power output shaft is situated at the side of said power input shaft opposite from said pair of differential outputs, and said pair of power take-off means including a pair of coaxial front and rear power take-off shafts situated at the side of said power output shaft opposite from said power input shaft.

7. The combination of claim 6 and wherein said means for selecting a given drive between said power input and power output shafts and said means for connecting said gear-drive means to or disconnecting it from said power output shaft each include first and second longitudinal parallel shafts, a connecting rod extending between and pivotally connected with said first and second shafts, said first shaft being formed with an elongated groove and with a recess near an end of said first shaft and said second shaft being formed with a pair of recesses respectively corresponding to said groove and recess of said first shaft, and a pair of transverse locking rods extending between said first and second shafts and having rounded ends for engaging in said groove and recess of said first shaft and said recesses of said second shaft, and a pair of spring-pressed balls engaging said first and second shafts for being selectively received in the recesses near the ends thereof to alternately lock one or the other of said first and second shafts.

8. The combination of claim 7 and wherein an end stop means coacts with each of said first and second shafts for limiting the movement thereof.

9. The combination of claim 8 and wherein a shiftable gear and clutch ring is operatively connected with one of said first and second shafts to be controlled thereby.

10. The combination of claim 6 and wherein said differential lock-out means and said means for engaging said front axle drive shaft include a pair of clutch rings, a pair of end rods operatively connected with said clutch rings for actuating the latter, respectively, and a pair of intermediate rods connected in series to each other and connected between said pair of end rods for simultaneously actuating the latter to engage said front drive shaft when said differential lock-out means is engaged and to disengage said front drive shaft when said differential lock-out means is disengaged, a rocker operatively connected with one of said intermediate rods for actuating the latter to operate said end rods, and an actuating nut operatively connected with said rocker.

11. The combination of claim 10 and wherein an eccentric means is operatively connected with said rocker for adjusting said rods.

12. The combination of claim 11 and wherein an elongated threaded rod carries said actuating nut and has an pair of opposed ends one of which is formed with a recess, end-stop means coacting with the other end of said threaded rod, and a spring-pressed ball coacting with said recess of said threaded rod.

* * * * *